F. GAHM.
BUMPER FOR AUTOMOBILES.
APPLICATION FILED JUNE 16, 1921.
1,390,285.
Patented Sept. 13, 1921.
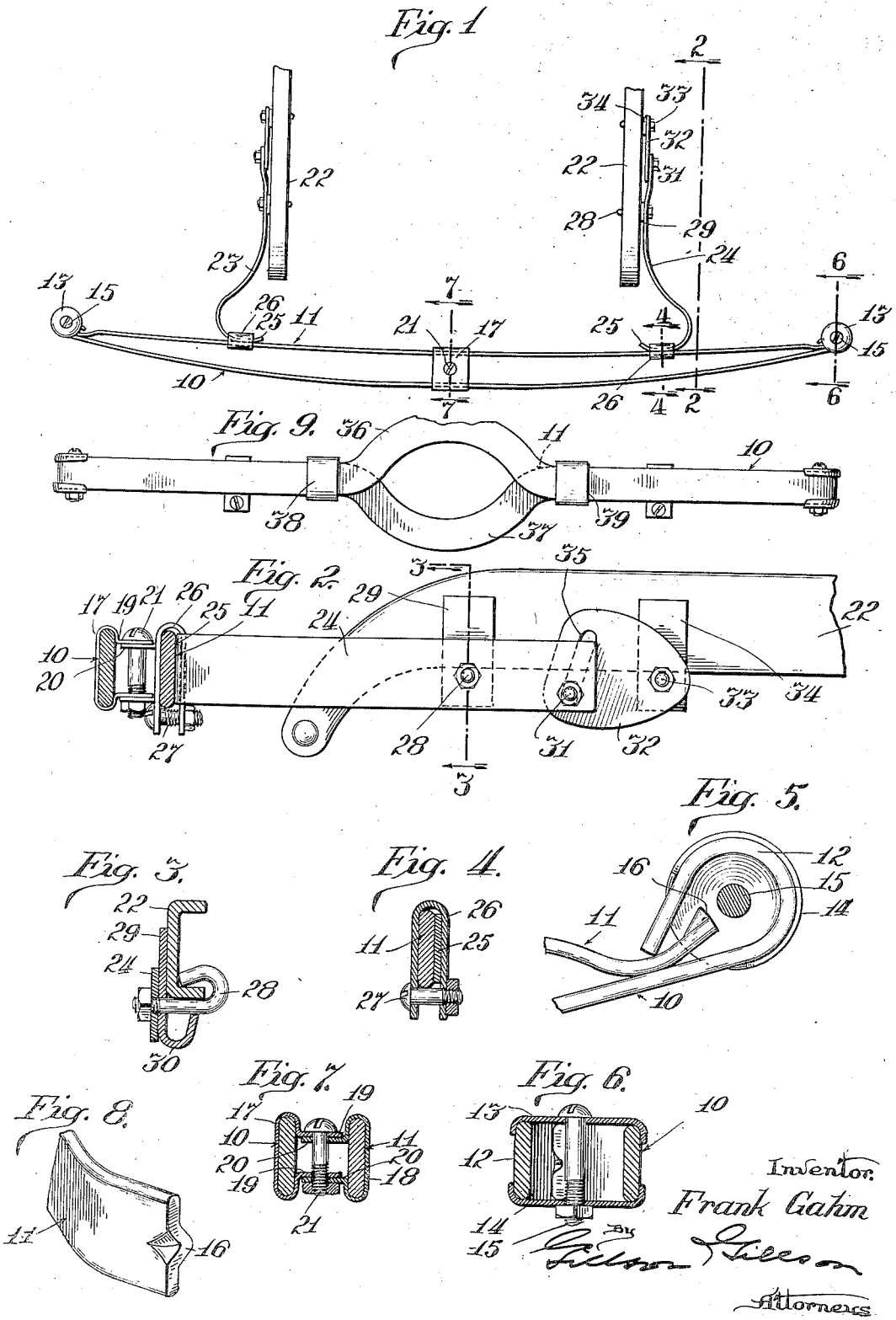
Inventor:
Frank Gahm

UNITED STATES PATENT OFFICE.

FRANK GAHM, OF STREATOR, ILLINOIS.

BUMPER FOR AUTOMOBILES.

1,390,285.  Specification of Letters Patent.  Patented Sept. 13, 1921.

Application filed June 16, 1921. Serial No. 478,034.

*To all whom it may concern:*

Be it known that I, FRANK GAHM, a citizen of the United States, and resident of Streator, county of La Salle, and State of Illinois, have invented certain new and useful Improvements in Bumpers for Automobiles, of which the following is a specification and which are illustrated in the accompanying drawings, forming a part thereof.

The invention relates to bumpers adapted to be secured to the chassis of an automobile, for protecting the vehicle from injury in the event of collisions.

Its objects are to simplify the construction, and to generally improve the operation and efficiency of devices of this class; and it consists in a structure such as is hereinafter described, and as illustrated in the accompanying drawings, in which—

Figure 1 is a plan view of the improved bumper attached to the frame members of a car, portions of which are shown;

Fig. 2 is a sectional view on the line 2—2 of Fig. 1;

Fig. 3 is a detail section on the line 3—3 of Fig. 2;

Fig. 4 is a detail section on the line 4—4 of Fig. 1;

Fig. 5 is a detail plan section of the end of the bumper;

Fig. 6 is a sectional view on the line 6—6 of Fig. 1;

Fig. 7 is a detail section on the line 7—7 of Fig. 1;

Fig. 8 is a detail in perspective of the end of one of the bars of the bumper; and Fig. 9 is a front elevation of the bumper bar showing a modified form of construction.

The bumper comprises a pair of flat steel bars 10, 11, of sufficient length to extend across the end of the vehicle. These bars are positioned one in advance of the other, their wider cross-sectional dimension being vertical. The forward bar 10 is bowed, and preferably the rearward bar 11 is slightly bowed but is of less curvature than the forward bar.

The ends of the two bars are slidingly interlocked, the end portion of one of them (preferably the forward bar) being folded to form a loop, as shown at 12,—the end of the other bar, as 11, projecting into the loop. The free end of the loop 12 is normally spaced from the bowed portion of the bar a distance not to exceed, and preferably somewhat less than, the thickness of the other bar, as 11. In assembling the parts this latter bar is forced laterally between the end of the loop and the body of the bar 10, and is therefore gripped by the end of the loop with a spring pressure.

A pair of caps 13, 14, are applied to the top and bottom of the loop 12, and are held in place by means of a screw bolt 15, passing through both of them. These caps prevent the vertical displacement of the bar 11 and also prevents dirt from being collected in the loop.

Preferably a boss 16 is applied to or formed on the end of the bar 11 to prevent its complete withdrawal from the loop 12, in the event of extreme flexure of the end of the bumper by a forwardly directed blow. Intermediate of their ends the two bars are united by means of one or more struts, each preferably taking the form of a pair of loops 17, 18, fitted upon the bars 10 and 11, respectively,—the end portions 19, 20, of these loops overlapping and being secured together by means of one or more bolts 21 setting vertically therethrough. The loops 17, 18, are preferably made of spring metal and are offset inwardly at the inner face of the bar to which each is applied.

The bumper thus formed is secured to the frame members 22 of the vehicle by means of curved spring arms 23, 24, the wider dimension of these arms being vertical. The forward ends, as 25, of each of the arms 23, 24, extend parallel with and bear against the inner face of one of the bars, as 11, and is attached thereto by means of a U-shaped clip 26 set down over these two elements and projecting below the same, a bolt 27 being set through its lower ends securely binding the parts together.

The rearward ends of each of the spring arms 24 is straight, and is secured to the frame member 22 of the vehicle frame by means of a hook bolt 28, passing through the arm and engaging the lower flange of the member 22, which is shown as having the usual form of a channel, a washer plate 29 being interposed between the arm 24 of the member 22, its lower end 30 being upturned and bearing against the bolt with a spring pressure.

The extreme inner end of each of the arms, as 24, is bolted, as shown at 31, to a plate 32 secured to the frame member 22 by means of a bolt 33 of the same form as the bolt 28, and having associated therewith a washer plate 34 of the same form as the washer plate 29. The bolt 31 extends through an oblique slot 35 in the plate 32, thereby providing for vertical adjustment of the arm 24 and positioning of the bumper at the desired elevation, the arm 24 being turned upon the bolt 28 as a pivot before the nuts are tightened.

In the modification of Fig. 9 the bars 10, 11, are shown as being bowed vertically, one upward and the other downward, at their middle portions, as shown at 36, 37, to give the bumper greater width. When this form of construction is followed two struts are employed for securing the two bars together, as indicated at 38, 39.

As thus formed the bumper and its appurtenances will all elastically yield under stresses of impact. The two bars 10 and 11 will bend independently, their engaging end portions sliding one upon the other, thereby preventing the transmission of longitudinal stresses to the one bar by reason of the flexure of the other. Severe blows upon the bumper at or adjacent to the strut or struts uniting the two bars will cause the elements of these struts to bend, their spring character returning them immediately to their normal form. The arms 24 will yield under blows, both longitudinally and laterally. A severe blow forwardly at the end of the bumper, tending to straighten the forward bar 10 and possibly bow it forwardly, will bring the boss 16 into play for preventing the rearward bar 11 from being drawn entirely out of the loop 12. Under other circumstances the boss 16 is without function.

Various changes of detail may be made without departing from the scope of the invention.

While the bumper is shown as applied to the forward end of the vehicle, it is equally applicable to the rearward end, any necessary changes in the attaching means being readily worked out by a skilled mechanic.

I claim as my invention—

1. A vehicle bumper comprising, in combination, a pair of spring bars arranged one in advance of the other and spaced apart intermediate of their ends and having their end portions in sliding contact and tied together, and means for securing the bars to a vehicle.

2. A vehicle bumper comprising, in combination, a pair of spring bars secured together and arranged one in advance of the other and spaced apart intermediate of their ends and having their end portions in sliding contact, and means for securing the bars to a vehicle.

3. A vehicle bumper comprising, in combination, a pair of spring bars arranged one in advance of the other, the forward bar being bowed and having its end portions looped backwardly, the loop slidingly receiving the end portions of the rearward bar, and means for securing the bars to a vehicle.

4. A vehicle bumper comprising, in combination, a pair of spring bars arranged one in advance of the other, the forward bar being bowed and having its end portions looped backwardly, the loop slidingly receiving the end portions of the rearward bar, means for preventing relative lateral movement of the end portions of the bars, and means for securing the bars to a vehicle.

5. A vehicle bumper comprising, in combination, a pair of spring bars arranged one in advance of the other, the forward bar being bowed and having its end portions looped backwardly, the loop slidingly receiving the end portions of the rearward bar, a pair of bolt united caps covering the open faces of each loop, and means for securing the bars to a vehicle.

6. A vehicle bumper comprising, in combination, a pair of spring bars arranged one in advance of the other, the forward bar being bowed and having its end portions looped backwardly, the loop slidingly receiving the end portions of the rearward bar, a pair of bolt-united caps covering the open faces of each loop, a boss on each end of the rearward bar, and means for securing the bars to a vehicle.

7. A vehicle bumper comprising, in combination, a pair of spring bars arranged one in advance of the other and spaced apart intermediate of their ends and having their end portions in sliding contact, a strut formed of spring metal interposed between the bars, and means for securing the bars to a vehicle.

8. A vehicle bumper comprising, in combination, a pair of spring bars arranged one in advance of the other and spaced apart intermediate of their ends and having their end portions in sliding contact and tied together, and a pair of bowed spring arms attached to the rearward bar and adapted for attachment to a vehicle.

9. A vehicle bumper comprising, in combination, a pair of spring bars arranged one in advance of the other and spaced apart intermediate of their ends and having their end portions in sliding contact and tied together, the bars being vertically bowed at their middle portions, the bow of one being upward and of the other downward, and means for securing the bars to a vehicle.

10. A vehicle bumper comprising, in combination, a pair of spring bars arranged one in advance of the other and spaced apart intermediate of their ends and having their end portions in sliding contact and tied together, one of the bars being bowed in vertical plane at its middle portion, and means for securing the bars to a vehicle.

FRANK GAHM.